Patented June 20, 1944

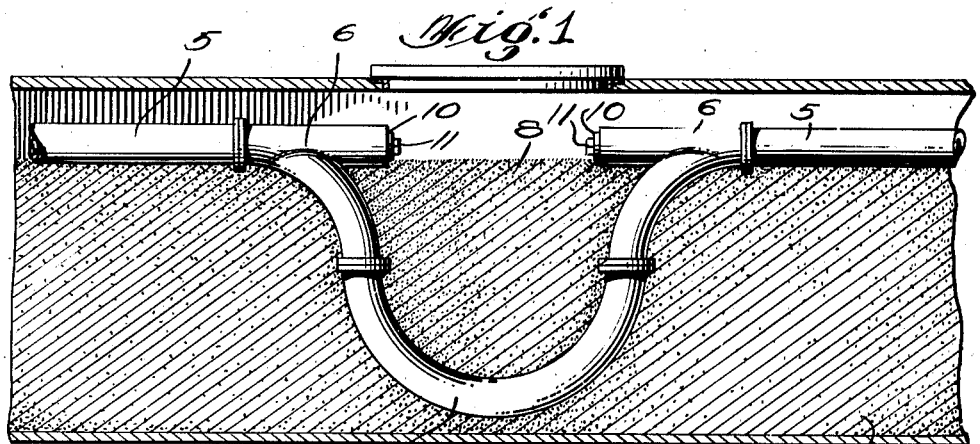
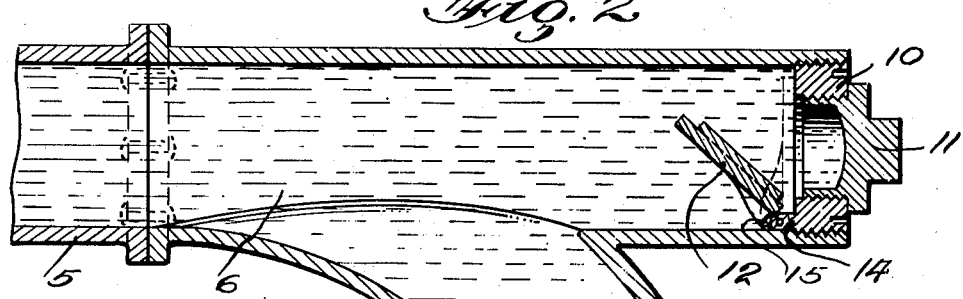
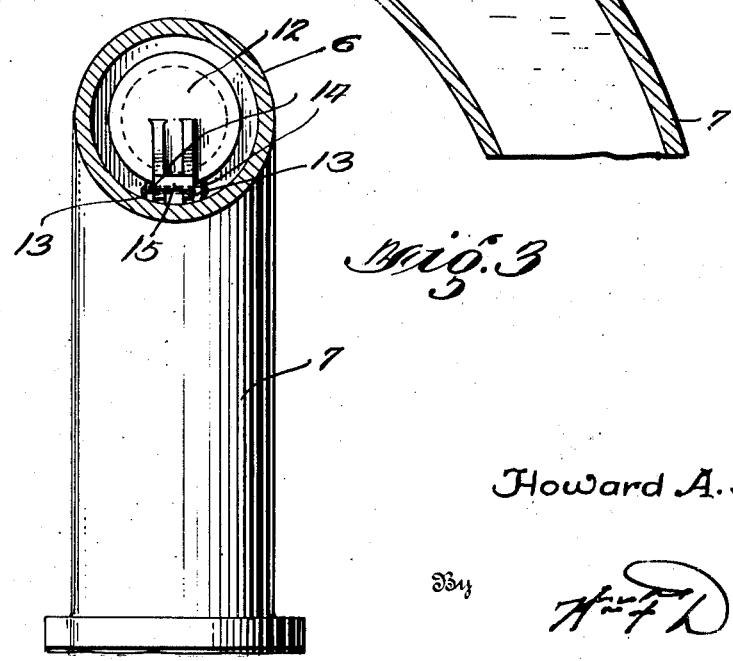

2,351,642

UNITED STATES PATENT OFFICE 2,351,642

UNDERGROUND PIPING

Howard A. Starret, United States Army

Application October 18, 1941, Serial No. 415,581

1 Claim. (Cl. 138—47)

(Granted under the act of March 3, 1883, as amended April 30, 1928; 370 O. G. 757)

The invention described herein, if patented, may be manufactured and used by or for the Government for governmental purposes without the payment of any royalty thereon.

This invention relates to underground piping and more particularly to the provision of means for reducing the shattering, breaking or other damage which might result from detonations occurring in the vicinity of the piping.

Observations on the effects of bomb detonations on piping laid underground have shown that piping is particularly vulnerable to breakage resulting from detonation even at considerable distances from the point of detonation. Any relatively simple means which would reduce this breakage would be of considerable service, both because it would reduce the amount of inconvenience resulting through interruption of utility services and would reduce the amount of labor and spare parts required for repair work.

This breakage may occur either because hammer shock effects shatter the walls of the piping, especially at turns in the piping, or because the motion of the ground is so great that the stresses in the piping exceed the safety limit.

Hammer shock originates in the extremely rapid vibrations of the ground which represent the first phase of the detonation shock wave. The period of the waves is of the order of hundredths of a second. Thus extremely rapid vibrations communicated to the walls of the piping will produce initial pressure waves in the fluid content of the pipe which may result in relatively high instantaneous pressures in the fluid. Besides this phase of the ground shock, there is a slower mass motion of the ground itself, with a period and an amplitude near the point of detonation comparable with that occurring in earthquakes. This motion of the ground produces such a large deflection in the piping that in many cases the piping is shattered.

It is, therefore, the object of this invention to provide an arrangement of conductors, to protect them from shocks and the like.

A further object is the provision of a fluid conducting piping having sections constructed to automatically compensate for twists and strains which may result from shocks and explosives.

A further object is the provision of fluid-conducting piping having joints provided with devices capable of being ruptured by shocks and the like to allow the fluid to flow freely from the piping and means controlled by flow of the fluid to automatically close the ruptured device to prevent further flow of fluid.

A most expedient method of minimizing the damage from hammer shock is by inserting in the walls of the piping blow out plugs which break when the instantaneous pressure exceeds a definite value. This value is chosen considerably lower than the pressure at which the piping is liable to rupture.

Blow out plugs have already proven their value in preventing damage from hammer shock originating from causes other than earth waves resulting from bomb detonations.

Besides this novel application of blow out plugs to alleviate this dangerous condition the piping is laid or suspended on a short shock-absorbing material such as fine dry sand or other material which reduces the amount of energy of the high-frequency earth waves communicated to the piping. In this way the amplitude of the pressure wave may be materially diminished. Although the blow out plugs reduce the damage to the piping, they do not provide for continuity in the service. In this design continuity of service is maintained by inserting into the piping a flap valve suitably mounted, so that, when the fluid flows out through the opening produced by the rupture of the blow out plug, the fluid flow automatically inserts the flap valve in a position to stop the flow of fluid out of the pipe line.

In order to minimize the possibility of breakage from the excessive deflection of the piping, the piping is laid on sand, with U turns of malleable material or universal joints inserted at turns in the piping or at other suitable positions. This device allows the piping to spread, twist or move relative to the ground a sufficient amount to reduce the stresses of tension, compression or shear arising from the deflection below the danger point. By using a malleable material or a universal joint there is provided a construction of such a character that the two levels of the U turn can undergo a definite amount of displacement relative to their normal condition without shattering or breaking.

With the above and other objects and advantages in view, the invention consists of features of construction, arrangement and operation of parts which will appear in specifications and be finally pointed out in the claim.

While the preferred embodiment of the invention is shown, it will be understood that slight changes in form and minor details of construction may be resorted to without departing from the spirit of the invention and fall beyond the scope of the claim.

Referring now to the drawing in which similar characters and references in the several figures indicate identical parts:

Fig. 1 is an elevational view of a pipe line embodying the invention.

Fig. 2 is a sectional view of a joint used in the pipe line.

Fig. 3 is a transverse section through the pipe line showing the valve in closed position.

Referring to the drawing, the fluid-conducting piping is shown to comprise straight pipe sections or the like 5, which are connected by angular joints 6 to the U-shaped, bowed sections 7 which are preferably made of malleable material. The straight sections 5 lie upon the surface 8 of a bed of dry, loose sand 9, while the bowed sections 7 are imbedded in the sand.

Each joint 6 is provided with an externally threaded insert 10 which is adapted to lie in a straight line with the straight sections 5. The insert 10 has internal threads therein which are adapted to receive a blow out plug 11 of material capable of being rapidly ruptured by a violent shock to produce an opening in the joint to allow the free escape of fluid in the pipe line.

Positioned in the angular joint 6 and adjacent to the plug 11 is a flap valve 12 which is adapted to lie in an inclined position toward the end of the joint 6. The flap valve 12 has extensions 13 thereon which are adapted to be hinged to projections 14 that are formed integral with the insert 10. Attached to the lower end of the flap valve 12, rotatively positioned in the walls of the joint 6, is a projection 15 which is adapted to keep the flap valve 12 in position previously described.

When plug 11 has been ruptured, the flow of the fluid through the opening created by the rupture bears against the flap valve 12, thereby forcing the latter to a position adapted to close the opening, thus preventing the escape of fluid from the pipe line.

It is thought that persons skilled in the art to which the invention relates will be able to obtain a clear understanding of the invention after considering the description in connection with the drawing. Therefore, it is regarded as unnecessary to go into a lengthy description of the operation of the device.

The invention, however, is not to be understood as restricted to the details set forth since these may be modified within the scope of the appended claim without departing from the spirit or scope of the invention.

Having thus described the invention, what is claimed as new and desired to secure by Letters Patent is:

An expansion joint for protecting a fluid conducting pipe from damage by explosions and shocks comprising a U-shaped section adapted to be inserted between the spaced ends of the aligned pipe sections, said U-shaped section have transverse sections at each end adapted to be secured to the aligned pipe sections, the unsecured ends of said transverse sections being spaced from and in alignment with each other and each end being closed by a plug adapted to be ruptured by an explosion or shock and having a flap valve positioned in the free end adjacent the plug and arranged to be closed by the flow of fluid through a ruptured plug.

HOWARD A. STARRET.